United States Patent [19]

Morris

[11] 4,346,995

[45] Aug. 31, 1982

[54] OFF AXIS OPTICAL SIGHT SYSTEM FOR A FIREARM

[76] Inventor: Donald D. Morris, 7904 N. Arizona Dr., Raleigh, N.C. 27604

[21] Appl. No.: 168,607

[22] Filed: Jul. 14, 1980

[51] Int. Cl.³ .............................................. G02B 27/34
[52] U.S. Cl. .................................................... 356/251
[58] Field of Search ............................... 356/251, 252

[56] References Cited

U.S. PATENT DOCUMENTS

| 683,203 | 9/1901 | Grubb | 356/251 |
| 2,633,051 | 3/1953 | Davis | 356/251 |
| 3,216,308 | 11/1955 | Northcutt | 356/251 |
| 3,963,356 | 6/1976 | Wiklund | 356/251 |

FOREIGN PATENT DOCUMENTS

| 562233 | 6/1944 | United Kingdom | 356/251 |
| 562240 | 6/1944 | United Kingdom | 356/251 |

Primary Examiner—Vincent P. McGraw
Attorney, Agent, or Firm—Mills & Coats

[57] ABSTRACT

The present invention relates to an optical sighting system for a firearm that basically comprises a concave meniscus sighting lens of approximately zero power and fully transparent located off the optical axis, and a light source located on the optical axis generally disposed at the reflective focal point of said lens, generally between the lens and the observer's eye. The lens is operative to reflect two coinciding images of the light source towards the observer's eye, and this gives rise to an appearance where the image of the light source appears at infinity and in focus on the sighted target.

3 Claims, 3 Drawing Figures

OFF AXIS OPTICAL SIGHT SYSTEM FOR A FIREARM

FIELD OF INVENTION

The present invention relates to firearms and more particularly to optical sights therefor.

BACKGROUND OF INVENTION

Optical sighting systems have been known and used in conjunction with firearms in the past. For example, one is referred to the disclosures found in U.S. Pat. Nos. 3,963,356; 3,439,970; and 4,136,963.

In U.S. Pat. No. 3,963,356 to Wiklund, there is disclosed an optical sight that basically comprises a semi-transparent lens assembly that includes two lens disposed in back-to-back relationship. Because of the semi-transparent nature of this lens arrangement, one would expect that less than fifty percent of the light being transmitted from the target object is able to pass through the lens. This alone makes this type of optical sight inefficient and ineffective for use in sighting objects in low lighted or dark areas which can be commonly encountered in combat or in police work.

In this same regard, it is common for the major sighting lens of an optical firearm sighting system to have one surface of the lens partially reflective coated. While this is advantageous in reflecting the light source image, such is not always compatible with firearms because during the cleaning thereof, it is possible that the respective compositions and solutions used in cleaning can remove the particular coating if such comes into contact with the lens.

Thus, in summary there is a real need for a simple and relatively inexpensive optical sighting device for firearms which is also efficient and effective in sighting targets at long range in low lighted or dark areas.

SUMMARY OF INVENTION

The present invention entails an optical sighting system for a firearm comprising a single piece, generally fully transparent concave meniscus lens of approximately zero power, and an off axis light source that is reflected by the lens back to the observer's eye. As used, the light source is disposed between the user's eye and the concave sighting lens and because the lens is generally fully transparent, substantially all of the light directed from the target passes through the lens to the user's eye while the light source appears at infinity in focus on the target.

It is, therefore, an object of the present invention to provide an optical sighting system for use in conjunction with a firearm that is effective and efficient in sighting target objects at long range, even in low lighted or dark areas.

Still a further object of the present invention is to provide an optical sighting system for a firearm that is generally fully transparent such that all or substantially all light entering the lens is transmitted therethrough to the eye of the user, accordingly providing maximum clarity of the target object even when disposed in low lighted or darkened areas.

Another object of the present invention is to provide an optical sighting system of the character described above wherein the lens although fully transparent is capable of reflecting an image of a light source disposed at the focal point of the lens in such a manner that the opposite surfaces of the lens each reflect and wherein the lens is so proportioned that the two reflected images coincide.

Another object of the present invention resides in the provision of an off axis optical sighting apparatus or system for a firearm of the character referred to above which is simple, relatively inexpensive, effective, practical, and easy to use and maintain.

It is also an object of the present invention to provide an optical sighting system for a firearm wherein the same can be provided with intermediate correcting lens means for correcting spherical aberration.

Other objects and advantages of the present invention will become apparent from a study of the following description and the accompanying drawings which are merely illustrative of the present invention.

Figure 1:
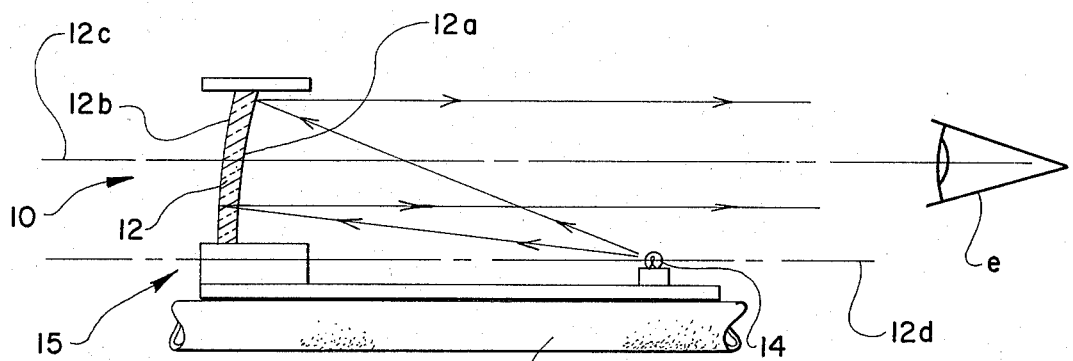
FIG. 1 is a side elevational diagrammatic view illustrating the optical sighting apparatus system of the present invention.

With further reference to the drawings, particularly FIG. 1, the optical sighting system of the present invention is generally diagrammatically illustrating in FIG. 1. The optical firearm sighting apparatus or system 10 comprises a lens 12 that is supported about a firearm 11 by a mounting frame structure indicated generally by the numeral 15. Lens 12 is referred to as a concave meniscus lens of approximately zero power and is generally fully transparent.

As seen in FIG. 1, lens 12 includes a front convex surface 12b, a concave surface 12a, and a line of sight 12c.

Forming a part of the optical sighting system 10 of the present invention is a light source 14 which is contemplated to comprise a light emitting diode and associated electrical circuitry for actuating the same. Light source 14 is generally disposed on the optical axis 12d of the system at the reflective focal point of lens 12. It is seen that the optical axis 12d is generally below the line of sight 12c and parallel thereto. Lens 12 is thusly operative to reflect light source 14 back towards the user's eye e. In this regard, the reflected light is directed in parallel collimated beam back to the eye.

The present system is referred to as an off-axis system in that the line of sight 12c is off the optical axis 12d having the light source 14 thereon.

Figure 3:
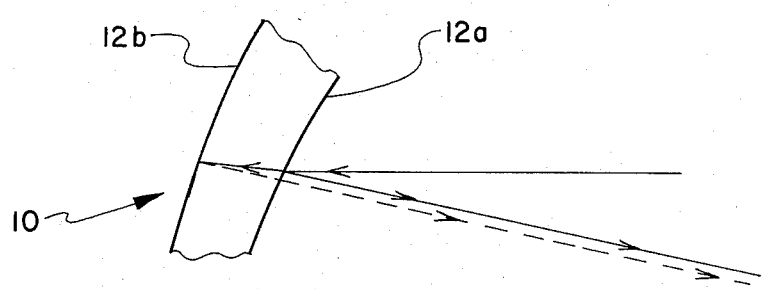
FIG. 3 is a view illustrating the reflection of light from both surfaces of the lens.

Of prime importance in the optical sighting system 10 of the present invention is the fact that in the embodiment illustrated herein, the respective surfaces 12a and 12b of lens 12 are particularly proportioned such that the two reflected images of the light source 14 will coincide as shown in FIG. 3. Because of the generally fully transparent nature of lens 12, it then follows that all or substantially all of the light directed from a target object facing convex surface 12b is transmitted through the lens 12 to the user's eye e. This gives the optical sighting system 10 of the present invention the capability of effectively and efficiently sighting target objects in dark or low lighted areas as well as in bright daylight. Consequently, when a target object is viewed through the lens 12, the light source 14 appears at infinity in focus on the target object.

Figure 2:
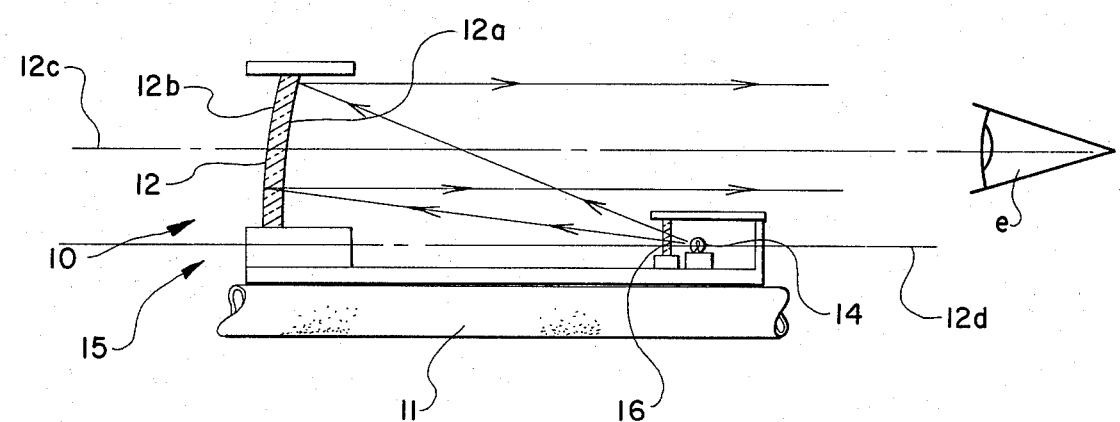
FIG. 2 is a side elevational diagrammatic view of an alternate design for the optical sighting system of the present invention.

Turning to FIG. 2, a modified optical sighting apparatus or system 10 is shown therein and as illustrated, this modified design is essentially identical with that shown and described with respect to FIG. 1 except there is provided a correcting lens 16 for correcting for spherical aberration providing good accuracy over the full area of lens 12. Without correcting the spherical aberration, the optical sighting system 10 of the present invention is only highly accurate in the center field. It has, however, been demonstrated that this is not objectionable on a rifle type firearm as the centering of the eye and image is quick and natural.

In another species of the present invention, one side of the lens is coated with an anti-reflection coating such as magnesium fluoride or any other conventional anti-reflection coating. The other side of the lens remains unchanged and is like lens 12 shown in FIGS. 1 and 2 and described hereinabove. Either side of the lens may include the anti-reflection coating, but it is contemplated that in a preferred embodiment that the convex or outer side of the lens would be the side that would include such a coating.

The provision of the anti-reflection coating on one side of the lens prohibits any substantial reflection of the light source and allows substantially all light from the target to pass through the lens. This produces a relatively sharp defined image of the light emitting diode and in fact allows the use of a smaller light source for potentially higher accuracy.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An off axis optical sight system for a firearm such as a rifle especially designed to be effective in situations where a target is situated in a dim or dark area a substantial distance from the observer and firearm, comprising: a generally fully transparent single concave meniscus lens of approximately zero refractive power and having an optical axis lying generally below the concave meniscus lens and parallel to the line of sight and convex and concave opposite sides with the concave side directly facing the eye of the observer sighting through said optical sight system; a light source disposed on said optical axis at generally the reflective focal point of said concave meniscus lens between the concave meniscus lens and the observer's eye; spherical aberration corrective lens means disposed inwardly of the reflective focal point of said fully transparent single concave meniscus lens and interposed between said light source and said concave meniscus lens for providing for the parallel passage of light from said concave meniscus lens to the observer's eye so as to correct the spherical aberration of said concave meniscus lens when acting as a reflector by effectively bringing the image of said light source to the same aiming point over substantially the entire visual field of said concave meniscus lens; and therein the respective surfaces of said concave meniscus lens are so proportioned to produce two coinciding images of the light source that appear at infinity in focus on a selected target, whereby the fully transparent concave meniscus lens allows maximum light to pass therethrough to the observer's eye such that the target appears clear to the observer.

2. The optical sight system of claim 1 wherein said light source includes a light emitting diode that is positioned generally below the fully transparent lens of said optical sighting system.

3. The optical sight system of claim 1 wherein the concave meniscus lens for viewing the target and reflecting the light source back to the eye of the observer consist solely and only of one single fully transparent lens having one concave surface directly facing the eye of the observer and one convex surface facing the target.

* * * * *